FREQUENCY CODED DIGITAL RECORDING SYSTEM
Filed Oct. 14, 1965
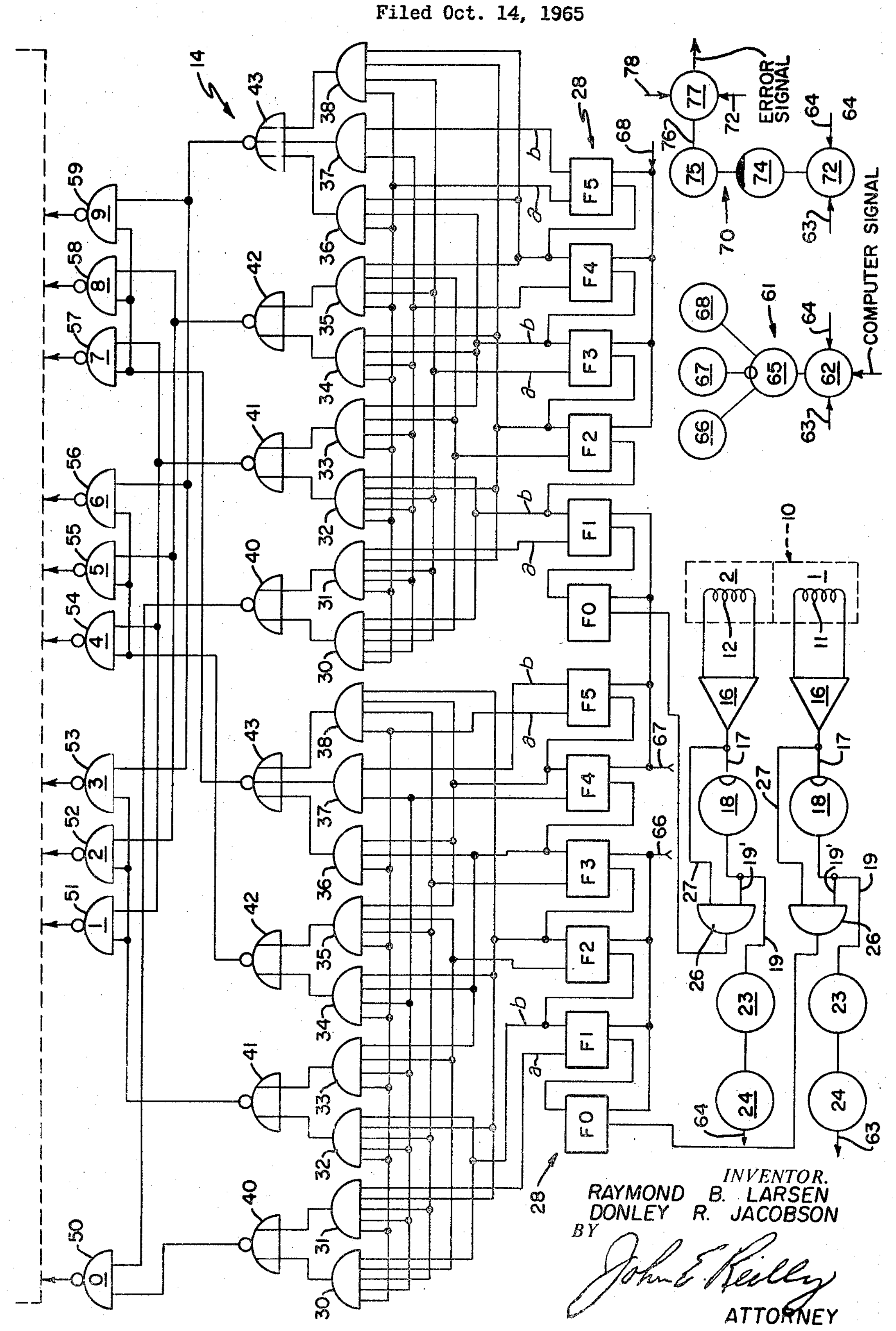
INVENTOR.
RAYMOND B. LARSEN
DONLEY R. JACOBSON
BY John E. Reilly
ATTORNEY United States Patent Office
3,548,404
Patented Dec. 15, 1970

3,548,404
FREQUENCY CODED DIGITAL RECORDING SYSTEM

Raymond B. Larsen, 107 E. Sunset Drive, and Donley P. Jacobson, 1123 Fairview Drive, both of Riverton, Wyo. 83119

Filed Oct. 14, 1965, Ser. No. 495,896
Int. Cl. H03k 13/20
U.S. Cl. 340—347 10 Claims

ABSTRACT OF THE DISCLOSURE

Intelligence characters represented on a recording medium, such as, a magnetic tape, by a combination of discrete frequencies recorded in parallel are decoded into digital signals by converting the frequency pulses into a corresponding number of voltage pulses and applying the voltage pulses to an electronic counting circuit which will advance a number of steps corresponding to the number of voltage pulses; and, through a logic input, will produce a signal representative of the number of steps advanced by the counter. The counters are reset at the end of each character for conversion of the next character in succession, and an error detecting circuit will sense erroneous information transmitted to or from the electronic counting circuit.

This invention relates to a novel and improved system for processing recorded information, and more particularly relates to a system for decoding intelligence characters recorded in the form of frequency combinations on a magnetic storage medium, such as for example, in the manner set forth in co-pending application for patent entitled "Data Record System," filed Sept. 16, 1963, Ser. No. 309,098, now U.S. Pat. No. 3,354,463.

In the hereinabove referred to co-pending application there is set forth and described a system for recording data on magnetic tape wherein each unit or character of information is represented by a selected combination of frequencies recorded in parallel on two or more channels of the tape. An error-checking circuit is provided by means of which faulty recording of a block of information, or a series of characters is so indicated to the operator, for example, due to incomplete recording of a character on the tape or recording of an extra character in a block of information possibly due to spurious noises. Where an error occurs, customarily the information on that block is re-recorded on tape to assure that a proper record is made for processing.

Once recorded, the problem is one of accurately reading the information contained on the recording surface, decoding it and converting it to a format compatible with a conventional computing system; and in so processing, to detect any erroneous information contained on the tape and to effectively block its entry into the computer.

It is important to recognize at the outset that in accordance with the invention set forth in said Pat. No. 3,354,463, the information is recorded on magnetic tape in the form of tone or frequency bursts which are separated by an area of no signal. Here the frequency bursts are characterized by consisting of a fixed number of cycles recorded within a constant time interval for each character depending upon the frequency level. For instance, if the recording process dictates that a 500 cycle per second tone be recorded, exactly 4 cycles or pulses should be recorded on tape; for a 1 kilocycle tone, 8 cycles should be recorded within the same constant time interval; for 2 kilocycles 16 cycles would be recorded, and for 4 kilocycles 32 cycles would be recorded. In each case, however, the exact number of cycles recorded may vary due to several factors, such as for example, "dropouts" of information, wrinkled or faulty tapes, etc. Nevertheless, it is important in converting the frequency bursts into digtal signals that some latitude be afforded in decoding each tone burst to compensate for minor faults in recording or in reading back the tape for input or read-out to a computing system, yet to provide for some means of error-checking the information processed into the computer in a manner corresponding to that in the recording system so as to block its entry into the computer or to in some way relate to the computer that the information in a particular block is erroneous.

Accordingly, it is an object of the present invention to provide for an improved input system for decoding and translating intelligence characters recorded in the form of frequency bursts into conventional signals for convenient and accurate entry into a computing system.

Another object of the present invention is to provide a decoding circuit which will accurately discriminate between correct and erroneous blocks of information wherein such blocks are expressed as frequency pulse combinations on a recording surface; yet will afford the necessary leeway or compensation for slight variations away from the selected frequency and will accomplish same in a simplified but highly reliable manner.

It is a further object of the present invention to provide a decoding circuit for use in combination with a recording system of the type characterized by its ability to record information expressed in the form of frequency pulse combinations in parallel on two or more channels of a magnetic tape recording system, and wherein the information can be rapidly read, decoded, error-checked and translated to a standard code compatible with different conventional computing units.

The above and other objects, advantages and features of the present invention will become more readily understood and appreciated from a consideration of the following detailed description of a preferred form of the present invention when taken together with the accompanying drawings, in which there is shown a block diagram of a preferred form of input unit in accordance with the present invention and generally illustrating its inter-relationship with a conventional computer.

For a better understanding and comprehension of the present invention, reference is made to the hereinbefore referred to Pat. No. 3,354,463. There, a numerical data recorder is described in which different combinations of two discrete frequencies are assigned to numbers ranging from "zero" to "nine." For the ten different units of information, four discrete frequency levels are required for pairing in ten different frequency combinations to represent the ten numerals thereby reducing the power, equipment and size of recording system necessary to record a given amount of information in the least amount of space. In the embodiment described therein, a series of oscillators generate frequency pulses at 500, 1000, 2000 and 4000 cycles per second, and two different frequency combinations being selected to represent a particular number with simultaneous recording in parallel on the recording surface. The information to be recorded is applied in sequence through a series of fifteen manual switches which are scanned and coded for recording a block of fifteen characters or bits of information on the tape with a selected spacing of short duration between characters in each block and with another selected spacing of longer duration between the blocks of information recorded on tape. An error-checking circuit then scans each block of information recorded and presents a signal if more or less than fifteen characters are recorded on tape.

Essentially, in accordance with the present invention, a tape cartridge containing the blocks of recorded information is removed from the data recording unit and placed on a tape deck 10 having a tape drive motor, not shown, for driving the tape at a predetermined rate of speed. The information recorded in parallel channels "1" and "2" on the tape is simultneously read by a pair of conventional pick up heads 11 and 12 into the decoding circuit 14 for translation to digital signals, such as, a binary code representative of each number recorded on the tape.

Again, it is important for an understanding of the present invention to recognize that each different frequency level selected is recorded over the same constant time interval on the tape and therefore will have a predetermined number of cycles or pulses for the particular frequency recorded. Thus, in the preferred form of invention, within the time interval for recording, 500 cycles per second would be represented by 4 pulses, 1 kilocycle would be represented by 8 cycles or pulses, 2 kilocycles would be represented by 2 kilocycles would be represented by 16 cycles and 4 kilocycles by 32 cycles, respectively. In practice however, the exact number of cycles will not always appear on tape so that slightly more or less than the exact number of cycles may be recorded while nevertheless representing a valid character of information; and as the frequency increases the variation from the exact number of pulses to be recorded can be expected to correspondingly increase.

In decoding the information from the tape, of course, the frequency itself could be measured but would require accurate knowledge first of the original frequency recorded and its tape speed both during recording and playback and would necessitate very close control over tape speed and frequency levels with little or no allowance for slight variations in frequency at each level without adapting a very complicated system. Accordingly, in the present invention it has been found to be highly advantageous to measure each frequency level by determining the number of cycles or pulses recorded on each channel of the tape for each character of information. To decode information in this manner, as well as to detect any errors in recording, it is necessary to generate a timing signal which is a measure of the length of each burst of information recorded on each channel of the tape, and at the same time to count the number of pulses or cycles in each burst of information. For this purpose, the playback head for each channel applies the frequency pulses as read off the tape to an amplifier 16 which amplifies each signal to a useful level and "squares" each signal to produce the sharp rise and fall times required for logic use. In essence the amplifier in this case forms an amplified, half-wave-rectified image of the frequency pulses, and the pulses are amplified to the level necessary for logic use. From the amplifier 16 the voltage pulses are applied through lead 17 to a retriggerable delay 18 which senses the voltage pulses in sequence and generates a timing signal over the length of each burst from the leading edge of the first pulse to the trailing edge of the last pulse in succession. In other words, the delay will produce an envelope of the recorded burst of information. This timing signal is applied through lead 19 to inverters 23 and 24, and through another lead 19' to control gate 26. Gate 26 is an "AND" gate which has another input 27 leading directly from the amplifier 16, and in response to the presence of a timing signal from the delay 18 will transmit voltage pulses received from the amplifier 16 to an electronic counter defined by a binary counting circuit 28.

In the binary counting circuit 28 for each channel there are provided six center-toggled flip-flops designated from "F0" to "F5" and which in a well-known manner will produce a binary representation of the number of pulses applied from the control gate 28. The outputs *a* and *b* of each flip-flop are connected to a diode matrix consisting of a series of "AND" gates 30 to 38 having logic inputs from the outputs *a* and *b* of the counter so as to produce an output at the gates corresponding to the binary representation or number setting of the counting circuit for a particular frequency level. Again, ideally, if each character recorded on the tape recording surface were exactly at the selected frequency level and represented by the exact number of frequency pulses it would be necessary only to provide a single "AND" gate for each frequency level recorded. Thus, for the four frequency levels of ½, 1, 2 and 4 kilocycles only four gates would be required to apply an output signal for each one of the four different frequencies in a conventional manner. In practice however, the actual number of pulses recorded on tape and applied within the envelope for each frequency level may vary while nevertheless representing a valid character. Thus, each frequency or tone burst recorded on tape may comprise more or less than the exact number of pulses, and it is therefore important that a pulse output range be selected in binary counting circuit for each frequency in order to properly cover variations from the exact number of pulses; also that a gating circuit be provided for each frequency which will produce an output signal in response to a binary number setting which is within the pulse input range selected for that frequency. For example, each of the gates 30 to 38 is set to open within the following ranges when the flip-flop stages are set at the following binary number settings:

| Gate number | Binary number (logic input) | | | | | | Pulse input range |
|---|---|---|---|---|---|---|---|
| | $F_5$ | $F_4$ | $F_3$ | $F_2$ | $F_1$ | $F_0$ | |
| 30 | 0 | 0 | 0 | 0 | 1 | X | 2–3 |
| 31 | 0 | 0 | 0 | 1 | 0 | X | 4–5 |
| 32 | 0 | 0 | 0 | 1 | 1 | X | 6–7 |
| 33 | 0 | 0 | 1 | 0 | X | X | 8–11 |
| 34 | 0 | 0 | 1 | 1 | X | X | 12–15 |
| 35 | 0 | 1 | 0 | 0 | X | X | 16–19 |
| 36 | 1 | 1 | 1 | X | X | X | 24–31 |
| 37 | 1 | 0 | X | X | X | X | 32–47 |
| 38 | 0 | 1 | 0 | 1 | X | X | 20–23 |

It is apparent here that the pulse input ranges selected for each "AND" gate as well as the number of gates required for each frequency is dictated in part by the fact that the gating network must be so interconnected with the logic inputs from the binary counting circuit as to selectively open one gate in response to a given number of pulses while closing the other gates. By way of illustration, in the foregoing example under the heading for Logic Inputs "0" indicates the absence of a signal, "1" indicates presence of a signal and "X" means that the flip-flop position or setting may either be at 0 or 1. For example, a 500 c.p.s. frequency burst on the tape should ideally have 4 cycles which would be applied as 4 voltage pulses to the counting circuit. The fourth pulse would set the counting circuit to the binary representation 000100. Thus output *b* of F2 would apply a signal to gate 31 and all other logic inputs to the gate 31 would be from the *a* side of the other flip-flops and similarly would be at 1 thereby opening the gate to transmit an output signal; whereas each of the other gates 30 and 32–38 would have at least one logic input set at 0 so as to be closed. Correspondingly, two or three pulses would set the counting circuit to open the gate 30 while closing the other gates to apply an output signal from the gate.

Here, gates 30 and 31 cover the pulse input range from two to five pulses and are connected in parallel to a common "OR" gate 40 so that an output signal either from gate 30 or from gate 31 would open the gate 40 in response to two to five voltage pulses. Similarly, gates 32 and 33 are connected in parallel to "OR" gate 41, gates 34 and 35 are shown connected in parallel to gate 42, and gates 36–38 are connected to "OR" gate 43. As a result, each one of gates 40 to 43 will apply an output signal in response to a signal from one of the gates 30 to 38 with which it is associated.

The signals from the counting circuit are correlated to produce a signal characteristic of the intelligence character represented by the frequency combination in the following manner: Since each unit of information is recorded in the form of two frequency bursts on parallel channels, the decoding circuit as described for each channel will simultaneously develop voltage signals at the output of one of the gates 40 to 43 representative of the frequency recorded on each channel. It will therefore be apparent that the output signals from the gates 40 to 43 for both channels may be combined according to the combinatorial code formed in the write circuit of the recording circuit to represent each of the numbers from "0" to "9" on the manual switch settings; and the number expressed by the frequency combinations recorded on tape may readily be determined by connecting the output leads of the gates 40 to 43 from both channels in the same relation to a series of "AND" gates 50 to 59 representative in order of the numbers "0" to "9." For instance, where the number 5 is represented by the combination 1 kc. on channel 1 and 2 kcs. on channel 2 the output leads for the "OR" gate 42 of channel 1 and 42 of channel 2 are connected to the gate 55 so that the latter will apply an output signal in response to the presence of a signal from the "OR" gates. In turn, each signal representative of a number recorded can be applied in the form of a binary coded decimal, for instance, to be read into an IBM 1620 computer in accord with conventional practice. It will be evident here that once useable signals are derived at the "OR" gates 40 to 43 they can be combined and translated in a conventional manner to any standard coding system for reading into computing equipment.

The reset circuit is generally designated at 61 and may suitably include a node 62 wherein the node or output is ground or logic 1 when either input 63 or 64 from the inverter 24 on channel 1 or 2, respectively, is negative or a logic 0. Conversely, when both inputs 63 and 64 are at a logic 1, or ground the output at the node is a logic 0. The latter condition occurs at the end of the timing signal from each channel whereupon the node 62 advances to logic 0 for timing a oneshot delay 65. The oneshot delay 65 is set to apply a pulse for driving three nodes 66, 67 and 68 a predetermined duration of time after the timing signal is completed thereby indicating the end of the character, and prior to the input of each next character or set of pulses. Here the nodes 66 to 68 are connected to the counter of each of the channels to reset the counters to 0 for the next stage, and the signal derived from the one-shot delay is employed also to indicate to the computer, or buffer memory leading to the computer, that the counters are through counting and to read the last count preceding the signal from the one-shot delay. Actually, the signal for indicating the end of each tone burst may be applied directly from the inverter 24 at the output of the retriggerable delay whereupon through a suitable "AND" gate arrival of a signal from both inverters for the channel will open the gate to apply the last information received from the decoding circuit. Then, a predetermined time interval thereafter the one-shot delay will simply reset the counting circuits after providing enough time for the last count to be read into the buffer memory or other suitable control circuit leading to the computer.

The error-detecting circuit is generally designated at 70 and similarly includes a node 72 operative in response to timing signals from the inverters 23 and 24 for each channel to apply a corresponding output signal to another one-shot timer 74. This timer will start timing the signal to produce a logic 0 on its output and invert a node 75 to a logic 1, which node in turn has input 76 into a second into a second node 77, the latter also being controlled by the condition of node 72. Here, the timer may be set to produce an error signal through node 77 if the timing signal is of a predetermined time duration less than the constant time interval selected for recording on the tape, for example, due to loss or "dropout" of information (or pulses) in each tone burst or block over and above some selected amount. Thus the one-shot delay 74 may be set in such a manner that when the input from the node 72 goes to 0 a fixed time will lapse before the output of the delay 64 produces a logic 0 pulse. This pulse is inverted to logic 1 by inverter 74 to the node 77 and similarly a node 78 from the buffer memory, not shown, is at a logic 1. If prior to the point in time selected for the delay 74 to go to a logic 0 the timing signal is completed from either of the inverters 24, the node 72 will return to a logic 1 thereby switching node 77 to a logic 0 to indicate an error, which for example, may be stored in a cross-coupled inverter or memory device in the buffer control section. It will be evident here that an error signal will be developed in the circuit whether a short character exists due to "dropouts" of information in the middle or at the end of the character since in either event the timing signal from the retriggerable delay 18 will end prior to the selected time interval for the delayed one-shot 74 to time out so as to switch the node 77 to a logic 0 or negative-going pulse.

The decoding circuit of the present invention similarly lends itself well to indication of a complete loss of a character on tape, or where excessive noise causes the addition of a character in a block of information. Generally, therefore, the error circuit may operate to detect errors caused by a short length character, character loss, or addition of a character to a block for example introduced by high noise levels. It is emphasized here that the decoding circuit will read out this information and, for example, where it is to be entered into a memory core the error signal generated may be utilized to unload the core to prevent the characters in an erroneous block of information from entering the computer.

Only for the purpose of exemplifying the use of a decoding circuit as part of an input system to a computer, as a general proposition the decoding circuit converts the frequency pulse signals into amplified pulses which are decoded and translated into a format of digital signals compatible with the computer. The information may be read into a buffer memory and thereafter may be applied to an output circuit which suitably consists of the sensing lines, amplifiers and gates needed to prepare the signals for read-out to the computer. Suitably, an interface conversion circuit may receive the necessary control signals from the computer and convert them to the logic levels and timing consistent with the logic and timing employed in the decoding circuit, and a system control would similarly convert the control signals to a wave-shape and level acceptable to the computer whereby to correlate the action of the decoder, buffer memory and output circuits. Of importance here, however, is that the control would provide the necessary gating, timing circuits and counters for the purpose of reading the decoded information from the tape, placing the information in the buffer memory, and reading out of the buffer memory into the computer at selected time intervals as well as to detect and eliminate or flag errors in the information being read into the buffer memory.

While a preferred embodiment of the present invention has been shown and described, it will be obvious to those skilled in the art that various modifications and substitutions may be made without departing from the spirit and scope of the invention which is to be limited only within the scope of the appended claims.

What is claimed is:

1. Decoding apparatus comprising input means for supplying intelligence characters represented by a combination of discrete frequencies transmitted in parallel channels as frequency pulses over a constant time interval, means associated with each channel for converting the frequency pulses of each intelligence character into a corresponding number of voltage pulses, timing means responsive to said voltage pulses for generating a timing signal over the duration of the voltage pulses in each intelligence character, and an electronic counter associated with each channel being opened and closed respectively by the beginning and end of each timing signal, to advance a number of steps corresponding to the number of voltage pulses, logic input means for each channel being operative to produce a signal representative of the number of steps advanced by each counter, and means correlating the signals produced by said logic input for each channel means to produce a signal characteristic of the intelligence character represented by the frequency combination.

2. Decoding apparatus according to claim 1 in which said electronic counter is defined by a binary counting circuit having a series of flip-flop stages being advanced by the number of pulses received from said converting means to produce a binary output value corresponding to the number of pulses received.

3. Decoding apparatus according to claim 1, in which said converting means includes an amplifier for amplifying and producing a voltage pulse defining a half-wave rectified image of each frequency pulse, and said timing means being defined by a retriggerable delay for producing a voltage signal from the leading end of the first voltage pulse in each character to the trailing edge of each voltage pulse in each character.

4. Decoding apparatus according to claim 1, further including reset means for transmitting a reset signal to each of said counters a predetermined time interval after completion of the timing signal from each of said timing means.

5. Apparatus for decoding intelligence characters represented by a combination of discrete frequencies recorded on parallel tracks as frequency pulses over a constant time interval into digital signals comprising amplifying means associated with each track for converting the frequency pulses of each intelligence character recorded into a corresponding number of voltage pulses, timing means for generating a timing signal over the duration of the voltage pulses in each intelligence character, an electronic counter associated with each channel including a control gate being opened and closed by the beginning and end of each timing signal to advance said counter a number of steps corresponding to the number of voltage pulses, output gating means having logic inputs from said counter to produce a voltage signal representative of the number of pulses received by said counter, reset means responsive to the end of the timing signals from each of said timing means for resetting each of said counters for each next character in succession and error detecting means responsive to a timing signal when of a predetermined duration less than a predetermined time interval selected for recording to produce an error signal.

6. Apparatus for decoding intelligence characters each represented by a different combination of discrete frequencies simultaneously recorded in parallel as frequency pulses over a constant time interval on channels of a magnetic recording surface comprising amplifying means associated with each channel for converting the frequency pulses of each intelligence character into a corresponding number of amplified voltage pulses, timing means for generating a timing signal over the duration of the voltage pulses in each intelligence character, an electronic counter associated with each channel including a control gate being opened and closed by the beginning and end of each timing signal to advance said counter a number of steps corresponding to the number of voltage pulses in each character, a gating circuit connected to the outputs of said counter to produce a voltage signal representative of the number of pulses received by said counter, means correlating the voltage signals produced substantially coincident in time by each of said gating circuits to produce a signal characteristic of the intelligence character represented by the frequency combination, reset means responsive to the end of the timing signals from each of said timing means for resetting each of said counters for each next character in succession, and error detecting means responsive to a timing signal when of a predetermined duration less than the constant time interval selected for recording for producing an error signal.

7. A decoding circuit for converting intelligence characters translated into different combinations of discrete frequencies wherein each frequency of the combination is recorded simultaneously in parallel on a multi-channel recording surface in blocks of frequency pulses over a constant time interval, said decoding circuit comprising, for each of said channels, means for amplifying and shaping each frequency pulse into a voltage pulse, timing means for generating a timing signal over the duration of each block of frequency pulses, a control gate being responsive to the presence of a timing signal from said timing means to transmit the voltage pulses, a binary number counter being advanced by the number of voltage pulses received from said control gate to produce a corresponding binary output value, a gating circuit including a plurality of AND gates for each output of said counter having a common OR gate for each series of AND gates with each series of AND gates being connected to the binary outputs of said counter to respond to a selected range of binary output values representative of a corresponding voltage pulse input range to apply a signal to its associated OR gate indicative of the pulse range applied to said counter, and a conversion circuit including means interconnected with the selected OR gate for each channel in different selected combinations, each corresponding to a selected frequency combination for each intelligence character whereupon receipt of a signal coincident in time from each of each associated OR gate said means is operative to produce an output signal characteristic of the intelligence character represented by the frequency pulses simultaneously applied to said multichanneled recording surface.

8. A decoding circuit according to claim 7, in which each series of AND gates covers a range of binary output values directly above and below the binary output value representative of each frequency level assigned in the formation of each different frequency combination whereby to compensate for variations in the exact number of frequency pulses recorded over the constant time interval.

9. A numerical decoding circuit for converting numbers into different pairs of discrete frequencies wherein each frequency of the combination is recorded simultaneously in parallel on a recording medium in the form of blocks of frequency pulses over a constant time interval, said decoding circuit comprising, for each of said channels, amplifying means for amplifying and shaping each frequency pulse into a voltage pulse, a retriggerable delay for generating a signal over the duration of each frequency pulse block, a control gate being responsive to the timing signal from said timing means to transmit the voltage pulses for each character over the timed duration of the timing signal, a binary counter advanced by the number of voltage pulses received from said control gate to produce a corresponding binary output value, a plurality of AND gates for each output of said counter having a common OR gate for each series of AND gates with each series of AND gates connected to the binary outputs of said counter to respond to a selected range of binary output values representative of a corresponding voltage pulse input range to apply a voltage signal to its associated OR gate indicative of the pulse range applied to said counter, and a conversion circuit including means interconnected with the selected OR gate for each channel in different selected combinations each corresponding to the selected frequency combination for each number whereupon receipt of a signal coincident in time from each of said associated OR gates said conversion circuit is operative to produce a digital output signal corresponding with the frequency pulse combination simultaneously applied in parallel to the channels of the recording medium.

10. A numerical decoding circuit according to claim 9, including a common reset circuit for each of said binary counters for transmitting a reset signal to each of said counters a predetermined time interval after completion of the timing signals coincident in time from each of said retriggerable delays, and an error detecting circuit for said decoding circuit being responsive to a timing signal when of a predetermined duration less than a predetermined time interval from one of said channels to produce an error signal.

References Cited

UNITED STATES PATENTS

| | | | |
|---|---|---|---|
| 3,193,812 | 7/1965 | Friend | 340—174.1 |
| 3,374,475 | 3/1968 | Gabor | 340—174.1 |
| 2,769,595 | 11/1956 | Bagley | 324—78 |
| 3,304,504 | 2/1967 | Horlander | 324—78 |
| 3,351,873 | 11/1967 | Kimura | 324—78 |
| 3,373,421 | 3/1968 | Wang | 340—347 |

OTHER REFERENCES

Camp, "Converter for Binary Coded Decimal to Binary Numbers," IBM Tech. Disclosure, vol. 2, No. 6, April 1960.

Anderson et al., "Binary Coded Decimal to Binary Translator," IBM Tech. Disclosure vol. 4, No. 3, August 1961.

MAYNARD R. WILBUR, Primary Examiner

G. R. EDWARDS, Assistant Examiner